July 22, 1952 W. E. PRESTON ET AL Re. 23,526
PIPE LINE STOPPER
Original Filed July 7, 1945 3 Sheets-Sheet 1
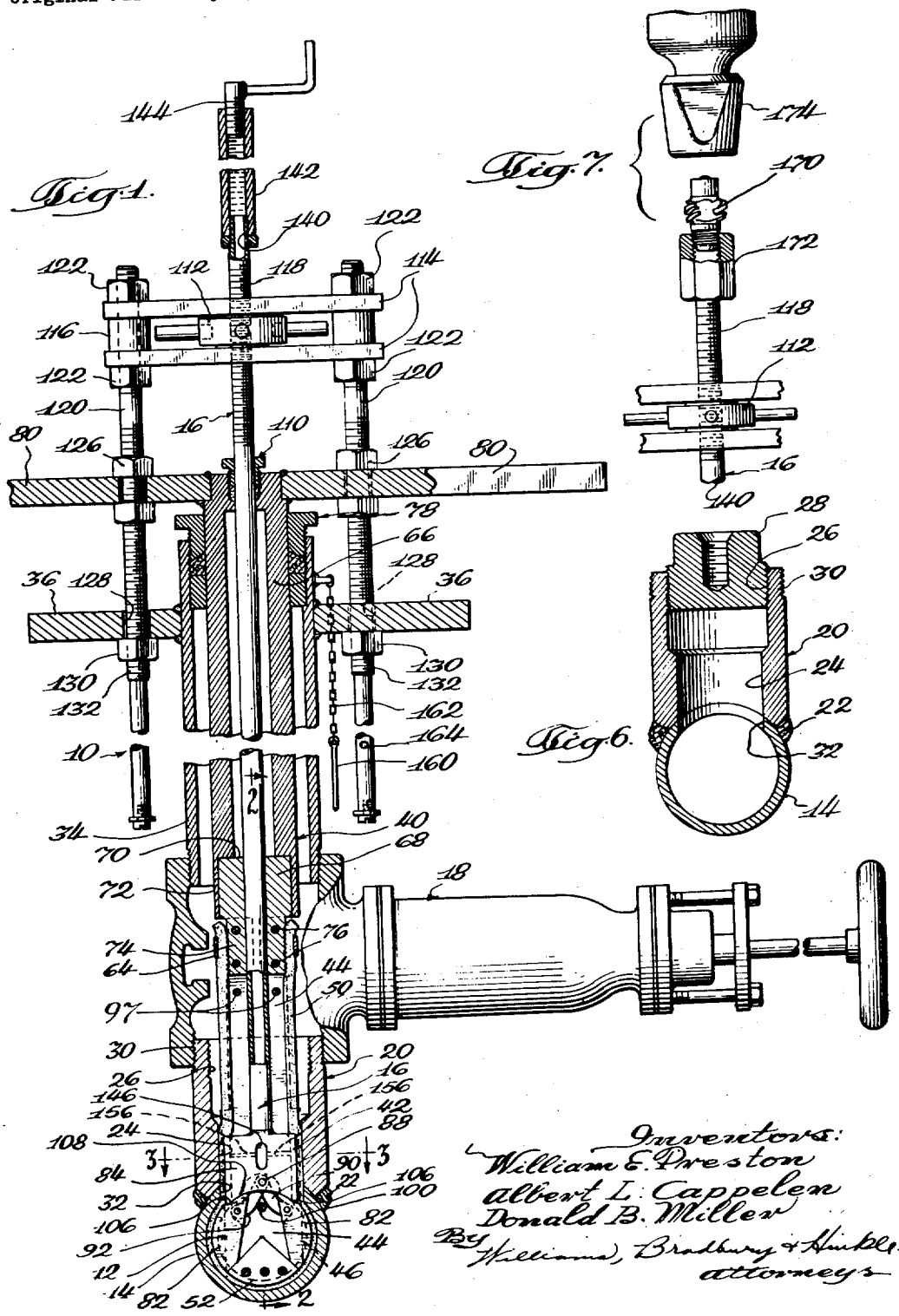
Inventors:
William E. Preston
Albert L. Cappelen
Donald B. Miller
By Williams, Bradbury & Hinkle
attorneys PIPE LINE STOPPER
Original Filed July 7, 1945 3 Sheets-Sheet 2
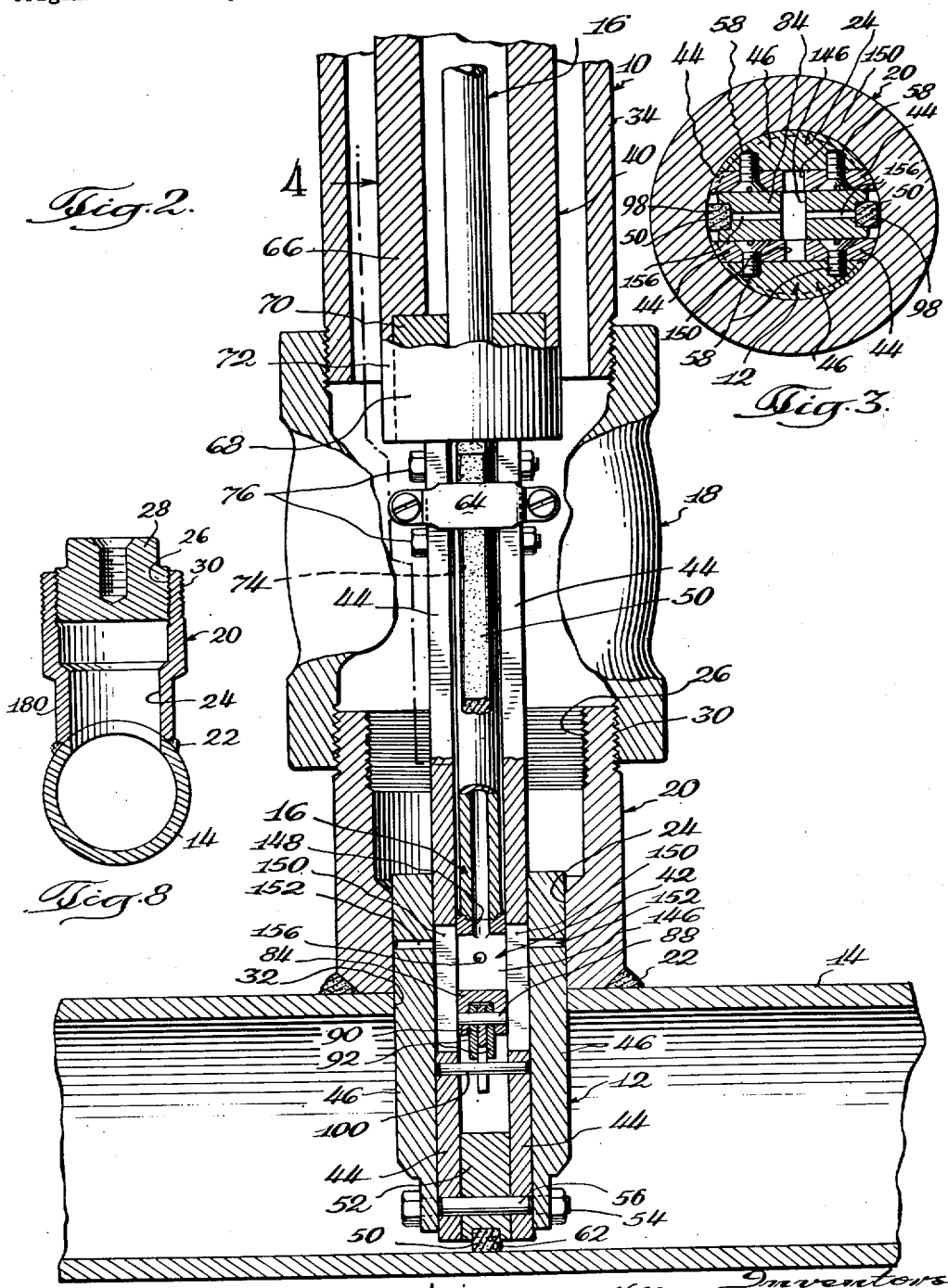
Inventors:
William E. Preston
Albert J. Cappelen
Donald B. Miller
By Williams, Bradbury & Hinkle
Attorneys PIPE LINE STOPPER
Original Filed July 7, 1945 3 Sheets-Sheet 3
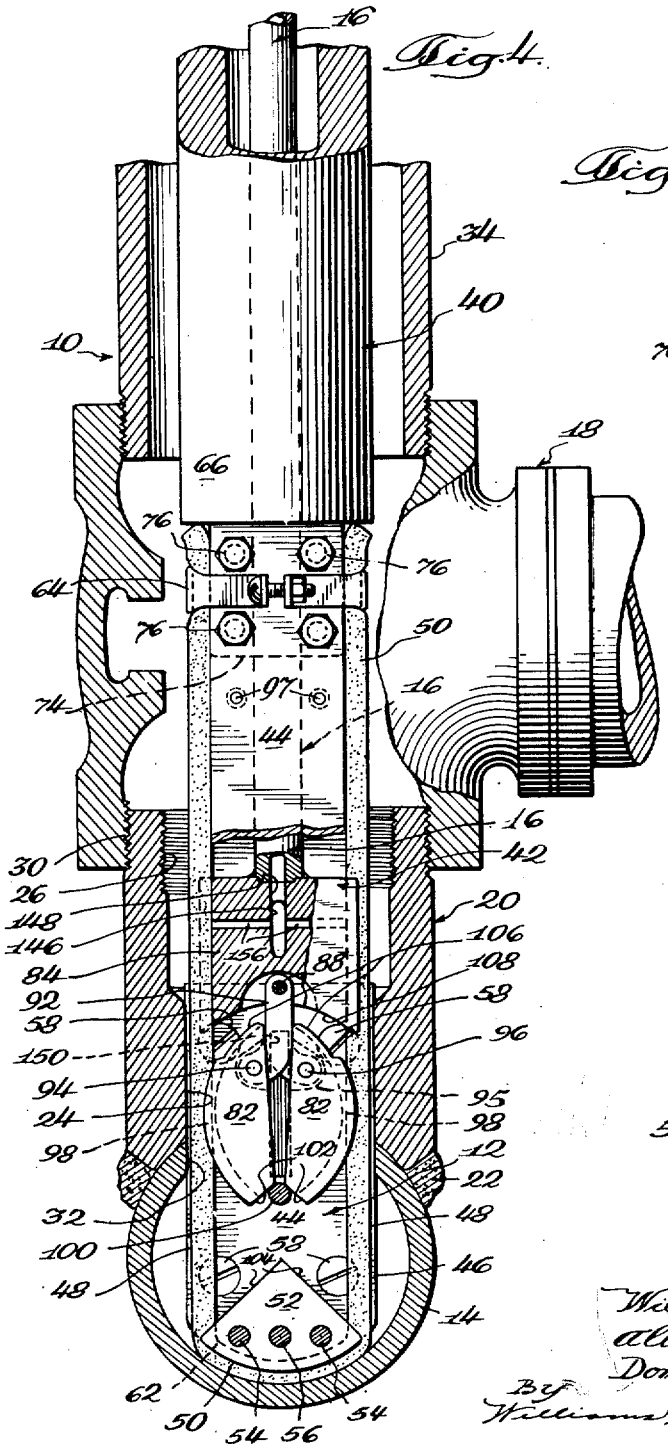
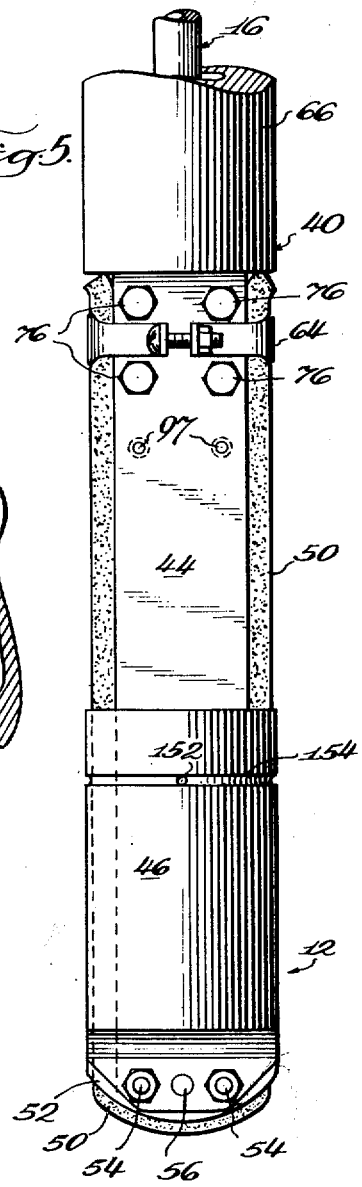
Inventors:
William E. Preston
Albert L. Cappelen
Donald B. Miller
By Williams, Bradbury & Hinkle
attorneys Reissued July 22, 1952 Re. 23,526

UNITED STATES PATENT OFFICE 23,526

PIPE LINE STOPPER

William E. Preston, Evanston, Albert L. Cappelen, Bensenville, and Donald B. Miller, Wheaton, Ill., assignors to Mueller Co., Decatur, Ill., a corporation of Illinois Original No. 2,476,907, dated July 19, 1949, Serial No. 603,672, July 7, 1945. Application for reissue October 17, 1949, Serial No. 121,678

25 Claims. (Cl. 138—94)

Matter enclosed in heavy brackets [ ] appears in the original patent but forms no part of this reissue specification; matter printed in italics indicates the additions made by reissue.

The present invention pertains to a pipe line or main stopper, and more particularly to a portable pipe line stopper which is especially adapted for emergency use.

The primary object of the present invention is to provide a new and improved pipe line stopper, characterized particularly by its simplicity of construction, operation, and efficiency.

Another object of the present invention resides in the provision of a new and improved portable pipe line stopper including valve means insertable into a pipe line through a hole formed therein and including coplanar valve members movable, preferably pivotally, into forceful engagement with the inside walls of the line.

A further object of the present invention resides in the provision of a new and improved pipe line stopper having improved sealing means, more particularly a packing material and sealing fluid supplying means, for improving the seal between the stopper and the pipe, thereby rendering the apparatus especially adapted for use in high pressure mains.

A further object of the present invention is the provision of a new and improved pipe line stopper including hydraulic means for holding pipe engaging valve members in contact with the inside wall of the pipe.

A further object of the present invention is to provide a new and improved pipe line stopper of the character adapted to be inserted into the pipe line through a nipple secured to the exterior of the line, characterized by the provision of improved sealing means for preventing the escape of fluid to the exterior of the pipe through the nipple.

A further object of the present invention is a new and improved nipple, particularly adapted for use with the pipe line stopper of the invention.

Other objects and advantages of the present invention will become apparent in the course of the ensuing description of the embodiment of the invention, in the course of which reference is had to the accompanying drawings, in which:

Fig. 1 is a vertical cross sectional view through a pipe line stopper constructed in accordance with the invention, the view illustrating the stopper installed in a pipe line and stopping the flow of the fluid through the line;

Fig. 2 is a fragmentary enlarged vertical cross sectional line taken along the line 2—2 of Fig. 1;

Fig. 3 is an enlarged horizontal cross sectional view taken along the line 3—3 of Fig. 1;

Fig. 4 is a vertical cross sectional view taken along the broken line 4—4 of Fig. 2, but with certain portions of the stopper in different positions;

Fig. 5 is an enlarged fragmentary side elevational view of that portion of the stopper which is inserted into the pipe line;

Fig. 6 is a vertical cross sectional view illustrating the manner in which the pipe line is sealed after use is made of the stopper;

Fig. 7 is a fragmentary elevational view, partly broken away, illustrating a modification of the invention; and Fig. 8 is a view similar to Fig. 6 illustrating a modified form of nipple constructed in accordance with the present invention.

In the past, considerable trouble has been encountered in stopping the flow of fluids, notably gas, in pipe lines or mains when it is desired to work at some point in the line ahead of which there is no valve for stopping the flow of gas. Heretofore, in practice at least, it has been usual to "freeze" the pipe lines ahead of the point at which it is desired to work, using water which is frozen in the line by ice or Dry Ice, usually the latter.

The stopper of the present invention is a mechanical device having many advantages. It can be inserted in place readily and provides a very secure stoppage of the flow of gas. It is illustrated in the drawings, as a whole, by reference character 10. It includes generally vertically (assuming a vertical installation) movable valve means 12 adapted to be inserted through a relatively small opening in a pipe line 14 and manually operable means comprising a tubular stem 16 for operating the valve means effectively to stop the main. The stopper is used in conjunction with a standard gate valve 18 and a nipple 20 of novel construction, as will be described in detail shortly.

The pipe line stopper of the present invention is, as already indicated, capable of stopping the flow of fluid, such as gas, in a live main. Therefore, means are provided to secure the stopper in place in such manner that gas will not escape. The first step in the application of the device consists in securing the nipple 20 to the pipe 14 as by welding it to the exterior of the unbroken pipe, as indicated by the reference character 22. The nipple has a lower portion with an elongated inner surface 24 machined to relatively close limits for a reason which will appear shortly. The upper portion has a larger inner diameter and internal threads 26 for the reception of a sealing plug 28 for sealing off the nipple after the stopper has been removed, the sealing plug being shown installed in Fig. 6. The nipple is also provided with external threads 30 at its upper end for the reception of the gate valve 18.

After the gate valve has been secured to the nipple, an opening 32 is drilled into the pipe line by suitable drilling apparatus secured to the upper end of the gate valve by known means which have not been illustrated. The hole 32 is drilled to have the same diameter as the opening 24 at the immediate adjacent end of the nipple 20. This hole, it should be noted, is substantially smaller than the inside diameter of the pipe line. After the hole has been drilled, the gate valve is again closed and the stopper of the present invention secured to the upper end of the valve, after which the valve is again opened and the valve means 12 of the stopper inserted into the pipe line and operated to stop the main.

The valve means 12 is supported for vertical movement in a tubular housing 34, the lower end of which is threaded onto the outer end of the gate valve. A pair of horizontally disposed oppositely extending guiding and positioning lugs 36 (see Fig. 1) are secured near the upper end of tube 34.

The valve means 12 and the operating member 16 include, in the main, two relatively movable parts, both of which are movable in the housing 34. One of the two relatively movable parts, which may conveniently be termed a carrier, is inserted into the pipe line and forcibly held against the bottom of the pipe and the other part, which may be termed a valve support, is thereafter also inserted into the pipe and operated by member 16 finally to seal the line. The two relatively movable parts of the valve means—the carrier and support—are indicated generally by reference characters 40 and 42, respectively. The former is best illustrated in Fig. 5, and the latter in Figs. 1, 4, and 6. The lower end of carrier 40 is constituted in the main by a pair of generally rectangular carrier plates 44 of generally rectangular cross section, a pair of segmental outer plates 46 fixedly secured to plates 44 and having outer surfaces curved to have a radius of curvature substantially equal to that of the openings 24 and 32 in the nipple and pipe, respectively. The flat sides of the plates 46, the sides adjacent the plates 44, are somewhat wider than the plates 44, as best illustrated in Fig. 5, thereby to provide a groove or channel 48 (see Fig. 4) for the reception of a strip 50 of suitable packing material. The strip should be thick enough to accommodate itself to small irregularities inside the pipe line.

The lower end of the carrier is also provided with a pipe engaging valve portion 52 fixedly secured to plates 44 and 46 and between plates 44 by suitable securing means such as the bolts 54, and a positioning pin 56. The plates 44 and 46 are additionally held to each other by the four screws 58 (see Fig. 4). The valve member 52 is disposed transversely of the line, i. e., in a diametral plane relative to the line.

The packing 50, it should be noted, also extends around the portion 52. The latter is provided with a peripheral groove 62 to receive the packing in such manner that the packing extends beyond the member and rests against the inside of the pipe wall when the stopper is inserted into the pipe line. The ends of the packing strip 50 are secured near the upper ends of the plates 44 by a clamping band 64.

The carrier 40 also includes a tubular upper member 66 to which the plates 44 and structures secured thereto are secured by a fitting 68. The upper circular end 70 of the fitting is secured in suitable manner, as by a press fit, to the lower recessed end 72 of tube 66 (see Figs. 1 and 2). The lower end 74 of the fitting is generally rectangular in section and constitutes a tongue, to the opposite sides of which the upper ends of plates 44 are secured. The tubular member 66 is vertically movable within the tube 34 in which it is movably supported by suitable packing and guiding structure indicated generally by the reference character 78 (see Fig. 1). A pair of oppositely extending handles 80 are secured to the upper end of tube 66 so that the valve means 12 may be moved vertically, and, especially, so that the carrier may be better forced against the bottom of the interior of the pipe.

The support portion 42 of the valve means 12 comprises, in the main, a pair of movable valve members 82, which are preferably segmental in shape and pivotally movable, see particularly Fig. 4, and a generally rectangular head 84. The valve members are so supported that they move pivotally about an axis extending lengthwise of the pipe line, i. e., they move transversely or diametrically of the pipe line and in the plane of valve member 52. More specifically, the valve members are pivotally secured to an axis defining pin 88 by links 90 and 92. The upper ends of the links are apertured to receive the pin 88 (see particularly Fig. 2) and the lower ends are apertured to receive pins 94 and 96, respectively, passing through link receiving slots 95 in valve members 82.

The valve members are so constructed and arranged that when the [carrier 40] *support 42* is moved upwardly, say to the position indicated in Fig. 4, then they are located within the confines of the [support 42] *carrier 40* whereby the valve means as a whole may be inserted into the pipe line. The upward movement of support 42 in carrier 40 is limited by a pair of stop pins 97 extending between plates 44 of the carrier. The construction is also such that when the head 84 is moved downwardly, the segment valves 82 are moved outwardly in opposite directions toward the inside wall of the pipe line, thereby to force the packing strip 50 securely against the inside wall. The outer peripheral portions of the valve segments are provided with peripheral channels 98 (see especially Figs. 3 and 4) to receive the packing strip and to force the latter against the wall of the pipe. It is to be noted that the coplanar arrangement of valve members 52 and 82 enables a single simple strip of packing to be used.

The valve members 82 are moved by a novel and simple arrangement. They are initially cammed apart by a pin 100 extending between the plates 44 and disposed a short distance above the top of the lower valve member 52. The valve members are shown in contact with this pin in Fig. 4. As the carrier and the head 84 with the valve members 82 are lowered, the valve members are spread apart and the lower inclined edges 102, which constitute cam surfaces, strike the upwardly facing inclined edges 104 of the lower valve member 52, which also constitute cam surfaces, whereby the valve members are moved transversely of the pipe and toward the side walls. The pin 100 at this time cooperates with the links 90 and 92 to insure continued outward movement of the links and prevents buckling thereof. If desired, the upper ends of the valve members may be cut away as indicated by reference characters 106, thereby to provide portions adapted better to engage the arcuate rounded lower end 108 of the carrier head 84, as best illustrated in Fig. 1.

When the stopper has been operated to stop the pipe line, it will be noted that the packing strip 50 is forced against the inside of the pipe line through the entire inner surface of the pipe wall and that it lies against the machined inside wall 24 of the nipple.

The valve operating member 16 is mounted for vertical reciprocating movement within tube 66. It is movable within fitting 68 at the lower end of the tube and in a packing gland indicated generally by the reference character 110 and located at the upper end of the tube. The vertically movable support 42 and associated parts including the operating member 16 are reciprocable vertically by a rotatable handle 112 held against vertical movement between a pair of plates 114 spaced by bushings 116. The upper end of operating member 16 is threaded, as indicated by reference character 118, so that, as the handle 112 is turned, the operating member 16 together with the various parts secured to it is reciprocated vertically to effect movement of the valve members 82. The plates 114 are prevented from moving vertically during manipulation of the hand wheel by the positioning and guiding bolts 120, the upper ends of which are fixedly secured to the plates 114 by the nuts 122, and, the intermediate portions of which are secured to handles 80 by nuts 126 at opposite sides of the handles 80, and the lower ends of which pass through apertures 128 in the lugs 36. Upward movement of the bolts 120 is prevented by nuts 130 threaded onto threaded portions 132 of the bolts 120. The nuts 130 are also utilized to hold the carrier valve portion 52 against the bottom of the pipe. It will be noted also that when the stopper as a whole, and tube 34 in particular, is secured to the gate valve, then bolts 120 hold the plates 114 against upward movement as the hand wheel 112 is turned to force the valve support 42 downwardly and the segmental valve members 82 transversely of the pipe.

In order to detach the stopper, after the support 42 has been retracted, as shown in Fig. 4, it is necessary only to unloosen the nuts 130, whereupon both the carrier 40 and support 42 may be moved upwardly out of the pipe and nipple.

In accordance with a further novel feature of the present invention, the seal is made more effective by the application of a sealing fluid, preferably a relatively heavy lubricant, to the interior of the pipe and against the packing strip and against the inside machined surface 24 of the nipple. The lubricant is forced to the places mentioned through the valve operating means 16, which is provided with an axial bore or passageway 140 extending throughout its length. A lubricant containing fitting 142 is detachably secured to the upper end of the bore and the fitting has a rotatable and downwardly movable piston 144 at its upper end. As the piston 144 is forced downwardly, the lubricant is forced through the bore 140 into the carrier head 84 and the space or recess between the segmental valve members 82.

The lubricant flows out of the lower end of bore 140 into a slot 146 in carrier head 84 through a short passageway 148 at the upper end of the support (see Figs. 2 and 4). From this slot the lubricant flows into the space between the segmental valve members 82 when the support is in a predetermined position relative to the carrier plates 44, through generally vertically extending narrow slots 150 in the plates 44, which are aligned relative to recess 146 as best illustrated in Figs. 2, 3 and 4. The lower ends of the slots 150 extend below the end of the support head 84, even when the latter is in its lowermost position as indicated in Fig. 2, so that lubricant forces the segmental valve members 82 outwardly against the inside walls of the pipe. Some of the lubricant also finds its way to the packing where it serves the advantageous purpose of providing a more secure sealing action.

The leakage of gas or other fluid out through the nipple is also prevented by a lubricant seal. The lubricant under pressure in recess 146 is also conducted to the inner wall 24 of the nipple. This is accomplished through a pair of opposed ports 152 leading to an external peripheral groove 154 extending around the segmental plates 46 of carrier 40. Lubricant is also forced to the packing strip 50 in the vicinity of the machine surface 24 through opposed ports 156 extending from the recess 146 to the channel 98 in the carrier head 84, as best illustrated in Figs. 2 and 4.

The use of the apparatus in stopping a live gas main will now be described. As heretofore briefly indicated, the first step in the use is the securing of the nipple 20 to the pipe line and the securing of a gate valve 18 to the upper end of a nipple. A drilling apparatus of known construction is secured to the upper end of the gate valve, after which the gate valve is opened, the hole 32 drilled, and the gate valve re-closed, and the drilling apparatus removed.

The stopper of the present invention is now ready for use. Before use, the carrier 40 and relatively movable support 42 are in their retracted positions, i. e., drawn within the supporting tube section 34, wherein they may be normally held as by a pin 160 secured by a chain 162 to the upper end of tube 34 and adapted to pass through a hole 164 in one of the bolts 120, whereby the bolt may be held by the pin 160 resting on the upper side of stop lug 36. It is a relatively easy matter when the apparatus is thus held to secure the tube 34 to the upper end of the gate valve when the gate valve is closed. The gate valve is then opened, the pin 160 removed, and both carrier and support are lowered through the gate valve and nipple into the pipe line. The carrier 40, which includes the quadrant shaped valve member 52 is forced securely against the bottom of the pipe by manipulation of the nuts 130 which act through bolts 120 and handles 80 to force the carrier 40 against the bottom of the interior of the pipe. The support 42 may now be lowered into the pipe by manipulation of the hand wheel, whereupon the segmental valve members 82 are cammed outwardly against the inside of the pipe wall. As a result, packing strip 50 is forced against the entire inner periphery of the pipe wall.

Additional pressure and more complete sealing is accomplished by the application of grease to the packing for sealing the pipe line and preventing the flow of gas through the nipple. The lubricant is supplied readily through the bore 140 in the valve operating member 16 with the result that, as previously described in detail, grease is supplied to the packing strip and also around the periphery of the stopper in the vicinity of the nipple.

After the desired work has been done on the pipe line or equipment connected to it, the stopper is released and detached from the pipe. This is effected simply by taking the pressure off the lubricant and rotating hand wheel 112 to lift the portion 42 of the stopper sufficiently to retract the valve segments 82 within the confines of the plates 44, as illustrated in Fig. 4, after which nuts 138 are released and the parts 40 and 42 are moved upwardly as a unit, by lifting the handles 80. The gate valve may now be closed and the stopper detached from the valve. The sealing plug 28 is secured to the internal threads 26 in the nipple by suitable apparatus (not shown) insertable through the gate valve, which is opened to enable this to be done.

Grease may be applied under pressure to the valve means through means other than that described. For instance, referring now to Fig. 7, it may be applied through a lubricant fitting 170 secured to a coupling 172 threaded to the upper end of the valve operating means 16. A suitable grease gun having a coupling 174 may then be used to apply grease under pressure to the stopper.

For smaller and thinner pipe lines it is preferred to use a nipple such as that illustrated in Fig. 8. This nipple is like that previously described except it has a reduced lower port 180 having a thickness approximately equal to the thickness of the pipe line. This enables a weld to be applied more readily because the nipple and pipe line are equally heated.

The present invention is susceptible of modifications other than that described above and it is therefore contemplated that the invention is not to be limited by the specific details of the described embodiments, except in so far as set forth in the accompanying claims.

Having thus described our invention, what we claim as new and desire to secure by United States Letters Patent is:

1. A pipe line stopper of the type insertable into a line through an opening in the line, including in combination, a carrier having a valve portion extending transversely of the line and being insertable through said opening into abutting relation with the interior of the pipe line, a support movable relative to the carrier, a pair of valve members disposed in the plane of the valve portion of said carrier, means movably supporting said pair of valve members on said support for transverse movement in said plane, and means for moving said pair of valve members in said plane to engage opposite sides of the pipe line when said support is moved relative to said carrier.

2. A pipe line stopper of the type insertable into a line through an opening in the line, including in combination, a carrier having a valve portion extending transversely of the line and being insertable through said opening into abutting relation with the interior of the pipe line, a support movable relative to the carrier, a pair of valve members disposed in the plane of the valve portion of said carrier, means movably supporting said pair of valve members on said support for transverse movement in said plane, a packing strip surrounding said pair of valve members and the portion of the carrier abutting against the interior of the pipe line, and means for moving said pair of valve members in said plane to force said packing strip into engagement with the interior of the pipe line when said support is moved relative to said carrier.

3. A pipe line stopper of the type insertable into a line through an opening in the line, including in combination, a carrier having a valve portion extending transversely of the line and being insertable through said opening into abutting relation with the interior of the pipe line, said valve portion having a cam surface on the side opposite that abutting against the interior of the pipe, a support above the cam surface movable toward and away from the cam surface, a pair of valve members disposed above the cam surface and in the plane of the valve portion of said carrier, means movably supporting said pair of valve members on said support for transverse movement in said plane, and means for moving said support toward and away from said cam surface whereby said pair of valve members are cammed toward and away from opposite sides of the pipe line.

4. A pipe line stopper as claimed in claim 3, wherein said carrier has an abutment below the valve members for spreading them apart during their initial movement toward the cam surface.

5. A pipe line stopper of the type insertable into a line through a round opening in the line, including in combination, a pair of flat sided valve members, a flat sided support aligned with said valve members and movably supporting said valve members, and a carrier comprising generally flat sided segmental members, the flat sides of which are adjacent the sides of the support and valve members, for movably supporting said valve members and support.

6. A pipe line stopper as claimed in claim 5, wherein portions of said valve members, carrier and support are grooved and encircled by a packing strip secured to the carrier.

7. A pipe line stopper of the type insertable into a pipe line through an opening in the line and having portions engageable with the inside of the line, characterized in that passage means are provided in the stopper leading to the pipe line engaging portions, and in that the stopper includes means through which sealing medium may be forced under pressure into said passage means.

8. A pipe line stopper of the type insertable into a pipe line through an opening in the line and including valve members movable in opposite directions to engage the interior of the line, characterized in that the stopper includes a recess and the valve members are mounted in the recess in such manner that the opposite edges thereof face each other and form part of a variable volume recess, and in that the stopper includes a sealing medium passage through which sealing medium can be forced under pressure into said recess.

9. A pipe line stopper of the type insertable into a pipe line through an opening in the line and including valve portions movable in opposite directions against the interior of the line, including in combination, a valve chamber, a pair of valve members mounted in said chamber and forming part of a variable volume chamber, packing means disposed to the outer sides of said valve members, and a sealing medium passageway extending to said chamber.

10. Pipe line stopping apparatus, including in combination, a tubular fitting having a machined inner surface secured to a pipe in alignment with an opening in the pipe line, and a stopper insertable into the pipe line through the fitting and opening and having a generally cylindrical inexpansible portion fitting closely in said tubular fitting when the stopper is inserted into the pipe line.

11. Pipe line stopping apparatus, including in combination, a tubular fitting having a machined inner surface secured to a pipe in alignment with an opening in the pipe line, and a stopper insertable into the pipe line through the fitting and opening and having a generally cylindrical portion fitting closely in the fitting when the stopper is inserted into the pipe line, said portion of the stopper having a sealing medium passageway on its exterior, and means for forcing sealing medium into said passageway.

12. A pipe line stopper of the type insertable into a pipe line through an opening in the line, characterized in that the stopper is provided with a generally cylindrical member having an annular groove on its exterior and with passage defining means through which a sealing medium may be forced under pressure into said groove.

13. A pipe line stopper, including in combination, a carrier insertable into an opening in the pipe line, a valve support movable relative to said carrier to engage the interior of the line said carrier having a generally cylindrical portion having an annular groove on its exterior, and passage defining means through which sealing medium may be forced into said groove, said passage defining means including passage means on the carrier and support adapted to be aligned only when the two are in predetermined relative positions.

14. Pipe line stopping apparatus, including in combination, a tubular fitting having a machined inner surface secured to a pipe in alignment with an opening in the pipe line, a stopper including a carrier insertable into the pipe line through the fitting and opening and having a generally cylindrical portion, fitting closely in the fitting when the stopper is inserted into the pipe line, said portion of the stopper having a sealing medium passageway on its exterior, a valve support movable relative to said carrier, a packing strip encircling said portion of the carrier in the region of the tubular fitting and a sealing medium passageway leading to the packing in the region of the tubular fitting, and means for forcing sealing medium under pressure through said passageway to the packing strip.

15. A pipe line stopper of the type insertable into a pipe line through a tubular fitting secured to and surrounding an opening in the line, characterized in that the stopper is provided with a generally cylindrical carrier having an annular groove on its exterior, a valve support movable relative to the carrier, a packing strip encircling the carrier and a portion of the valve support and secured to the carrier, and with passage defining means on the support through which sealing medium under pressure may be forced against the packing in the region of the tubular fitting and into said groove.

16. A pipe line stopper of the type insertable into a pipe line through an opening in the line, including in combination, a valve carrier insertable through said opening into the interior of the pipe line, said carrier including a pair of spaced apart segmental members arranged with their flat sides facing each other and a generally triangular valve defining portion located between said segmental members and extending a slight distance therebelow and having an external groove around its lower end, a support movably mounted between said segmental members, a pair of valve members located between said segmental members and pivotally secured to said support whereby they are movable transversely of the pipe line to engage the interior thereof, said valve members having an external groove, said carrier having also a tubular extension through which sealing fluid may be forced, a recess communicating with said tubular portion, external grooves in said carrier located above said valve members and in line with the grooves, and passageways from said recess to the grooves in said carrier, said carrier having internal passageways adapted to communicate with said recess and the region between said valve members when said support is located with the valve members inside the pipe line, and passageways from said internal passageways leading to the exterior of the segmental members, said segmental members having an annular passageway communicating with last said mentioned passageways, and a strip of packing material secured to said carrier and extending around the grooved portions of said valve members, and the lower valve portion of the carrier.

17 A pipe line stopper of the type insertable into a pipe line through an opening in the line, including in combination, a stopper portion insertable into the line through the opening and having packing means on its exterior, valve means movable to force the packing against the inside of the pipe line, sealing medium passage means in the stopper leading to the packing, and means for operating the valve means, said operating means having a passageway communicating with the sealing medium passageway whereby sealing medium may be forced into the latter passageway.

18. A pipe line stopper of the type insertable into a pipe line through an opening in the line, including in combination, a stopper portion insertable into the line through the opening and having packing means on its exterior, valve means movable to force the packing against the inside of the line, sealing medium passage means in the stopper leading to the packing, and means for operating the valve means, said operating means having a passageway communicating with the sealing medium passageway whereby sealing medium may be forced into the latter passageway, and a fitting secured to the stopper through which sealing medium is forced into said passageways.

19. A nipple for use with a pipe line stopper, comprising a tubular member adapted to be secured to the exterior of the pipe line, said member having at one end a machined inner sealing surface of a predetermined diameter adapted to cooperate with complementary sealing means on the stopper and an opposite end having both interior and exterior threads, the inner diameter of said interior threads being substantially greater than said predetermined diameter.

20. A pipe line stopper of the type insertable into a line through an opening in the line, including in combination, a carrier insertable into the line through the opening, a support movably mounted on said carrier and having valve means movable into engagement with the interior of the pipe line, and means for moving the valve means including a variable volume chamber of which the valve means form a part and a hydraulic operating medium passageway leading to said chamber through said movable support.

*21. A pipe line stopper comprising an elongated rigid body member and a slide member guided by said body member for longitudinal movement relative thereto, a pair of vanes normally extending longitudinally of one of said members and pivoted thereto transversely at their same ends*

*in laterally swinging relation, said vanes when in normal relation being insertable together with said members through a lateral opening in a main smaller than the inside diameter of the main with the vanes disposed transversely of the main, means on the other of said members for projecting said vanes upon relative sliding movement of said members, said vanes having outer edges curved substantially as the inside of the main, one of said members having a foot surface curved substantially as the inside of the main, and compressible means engaged between said curved surface and the bottom of the main and between said curved outer edges and the sides of the main when the stopper is inserted and the vanes are projected, whereby to provide a continuous seal between the stopper and main around to said opening.*

*22. A pipe line stopper comprising an elongated rigid body member and a slide member guided by said body member for longitudinal movement relative thereto, a pair of vanes normally extending longitudinally of one of said members and pivoted thereto transversely at their same ends in laterally swinging relation, said vanes when in normal relation being insertable together with said members through a lateral opening in a main smaller than the inside diameter of the main with the vanes disposed transversely of the main, the pivot point of said vanes being located adjacent one side wall of the conduit when said vanes are inserted, means on the other of said members for separating the free ends of said vanes to project said vanes upon relative sliding movement of said members, said vanes having continuous outer edges curved substantially as the inside of the main, one of said members having a foot surface curved substantially as the inside of the main, and compressible means engaged between said curved surface and the bottom of the main and between said curved outer edges and the sides of the main when the stopper is inserted and the vanes are projected, the edges of each of said vanes when projected extending from said opening substantially to said curved foot surface, whereby to provide a continuous seal between the stopper and main around to said opening.*

*23. A pipe line stopper comprising an elongated rigid body member and a slide member guided by said body member for longitudinal movement relative thereto, a pair of vanes normally extending longitudinally of said members, means pivotally connecting said vanes at one end to one*

*of said members for transverse movement in laterally swinging relation, said vanes when in normal relation being insertable together with said members through an opening in a main smaller than the inside diameter of the main with the vanes disposed transversely of the main, means on the other of said members for projecting said vanes upon relative sliding movement of said members, said vanes having outer edges curved substantially as the inside of the main, one of said members having a foot surface curved substantially as the inside of the main, and sealing means engaged between said curved surface and the bottom of the main and between said curved outer edges and the sides of the main when the stopper is inserted and the vanes are projected, whereby to provide a continuous seal between the stopper and main around to said opening.*

*24. Structure according to claim 21 wherein the vanes are pivoted on a common axis.*

*25. A pipe line stopper comprising an elongated rigid body, a pair of vanes pivoted to said body on an axis extending transversely of the body, said vanes being foldable together about said axis and when so folded being insertable together with said body through a lateral opening in a main with said axis extending lengthwise of the main, said opening being of smaller diameter than the inside diameter of the main, and means associated with said body and operable from the exterior of the main to oppositely project said vanes by swinging them about said axis, said vanes having continuous outer edges curved substantially as the inside of the main, the edges of each of said vanes when projected extending from said opening substantially to the opposite side of said main.*

WILLIAM E. PRESTON.
ALBERT L. CAPPELEN.
DONALD B. MILLER.

REFERENCES CITED

The following references are of record in the file of this patent or the original patent.

UNITED STATES PATENTS

| Number | Name | Date |
|---|---|---|
| 1,879,160 | Fowser | Sept. 27, 1932 |
| 1,885,896 | Carr et al. | Nov. 1, 1932 |
| 2,272,734 | Witte | Jan. 10, 1942 |
| 2,285,392 | Cline | June 9, 1942 |
| 2,285,393 | Cline | June 9, 1942 |
| 2,285,779 | Mueller et al. | June 9, 1942 |